US006981464B2

(12) United States Patent
Birman et al.

(10) Patent No.: US 6,981,464 B2
(45) Date of Patent: Jan. 3, 2006

(54) ILLUMINATED POINTER ENABLING INDEPENDENT POINTING ON TWO SCALES SIMULTANEOUSLY

(75) Inventors: Vyacheslav Birman, Rochester Hills, MI (US); Werner Eckardt, Rochester, MI (US); Christian Tanguy, Sterling Heights, MI (US)

(73) Assignee: Siemens VDO Automotive Corporation, Auburn Hills ( * ) Notice: Subject to any disclaimer, the term of this patent is extended or adjusted under 35 U.S.C. 154(b) by 0 days.

(21) Appl. No.: 10/951,090

(22) Filed: Sep. 27, 2004

(65) Prior Publication Data

US 2005/0103254 A1   May 19, 2005

Related U.S. Application Data

(60) Provisional application No. 60/523,329, filed on Nov. 19, 2003.

(51) Int. Cl.
   *G01D 11/28*    (2006.01)
(52) U.S. Cl. ............... 116/288; 116/62.1; 116/DIG. 6; 116/DIG. 36; 362/23
(58) Field of Classification Search ........ 116/286–288, 116/300, 301, 304, 62.1, 62.4, DIG. 5, DIG. 6, 116/DIG. 36; 362/23, 26, 27, 30, 555
See application file for complete search history.

(56) References Cited

U.S. PATENT DOCUMENTS

| 531,669 | A | * | 1/1895 | Weston ...................... 116/286 |
| 1,121,486 | A | * | 12/1914 | Evans ........................ 116/293 |
| 1,956,092 | A | * | 4/1934 | Ewald ......................... 362/23 |
| 1,999,073 | A | * | 4/1935 | Awrey ........................ 116/301 |
| 2,085,345 | A | * | 6/1937 | Tuttle et al. ................. 177/165 |
| 2,585,565 | A | * | 2/1952 | Luck ..................... 340/870.41 |
| 2,603,129 | A | * | 7/1952 | Dreyer ....................... 359/437 |
| 2,778,004 | A | * | 1/1957 | Lear et al. .................. 340/979 |
| 2,810,362 | A |  | 10/1957 | Lindheim |
| 3,262,416 | A | * | 7/1966 | Nichinson ................... 116/286 |
| 3,559,616 | A | * | 2/1971 | Protzmann .................. 116/332 |
| 3,603,282 | A | * | 9/1971 | Abromaitis ................. 116/288 |
| 4,054,105 | A |  | 10/1977 | Fegan |
| 4,300,470 | A | * | 11/1981 | Furukawa ................... 116/332 |
| 5,257,167 | A | * | 10/1993 | Clem ......................... 362/27 |
| 5,458,082 | A |  | 10/1995 | Cookingham |
| 5,703,612 | A |  | 12/1997 | Salmon et al. |
| 5,983,827 | A |  | 11/1999 | Cookingham et al. |
| 6,178,917 | B1 |  | 1/2001 | Jansa |
| 6,302,552 | B1 |  | 10/2001 | Ross et al. |
| 6,312,136 | B1 |  | 11/2001 | Kalashnikov |
| 2003/0090886 | A1 |  | 5/2003 | Eckardt et al. |
| 2004/0114340 | A1 |  | 6/2004 | Birman et al. |

FOREIGN PATENT DOCUMENTS

EP          0 411 799          2/1991

OTHER PUBLICATIONS

International Search Report dated Jun. 6, 2005.

\* cited by examiner

*Primary Examiner*—R. Alexander Smith

(57) ABSTRACT

An illuminated pointer includes an outer pointer that surrounds an inner pointer. The outer pointer extends from a base and is generally elliptical. The inner pointer extends from the base into the void of the outer pointer. The illuminated pointer utilizes a single light source for illuminating both the outer and inner pointer. The inner pointer provides easier reading of a dual scale gauge such as with a speedometer having both English and Metric speed scales.

15 Claims, 3 Drawing Sheets

US 6,981,464 B2

ILLUMINATED POINTER ENABLING INDEPENDENT POINTING ON TWO SCALES SIMULTANEOUSLY

This application claims priority to U.S. Provisional Application Ser. No. 60/523,329 which was filed on Nov. 19, 2003.

BACKGROUND OF THE INVENTION

This invention generally relates to an illuminated pointer for an instrument panel. More particularly, this invention relates to an illuminated pointer that provides independent pointing on two scales.

Instrument panels for a vehicle include several gauges for displaying and conveying information to a driver. The instrument panel typically includes a speedometer along with other gauges such as a tachometer, battery level indicator, and oil pressure gauge. Typically a pointer is mounted to move relative to the fixed graphical image on each gauge.

The pointer is typically one of two basic types, either a non-active pointer or an active pointer. A non-active pointer is illuminated by a light source mounted to a circuit board positioned behind a light transparent output shaft. Light is reflected into the pointer and scattered to illuminate the pointer. An active pointer includes a light source secured to the moving pointer.

In each configuration, the pointer includes a body portion that extends from a first end coupled to a motor and a second end that moves relative to the graphical image. The body portion is typically painted to block and direct light to provide consistent illumination throughout visible portions of the pointer. In many instances, the speedometer will include both an English scale in miles per hour (MPH) and a Metric scale in Kilometers per hour (Km/h). The English scale is usually placed radially about an axis of rotation of the pointer. The Metric scale is then placed in a smaller radial arrangement within the English scale. A single pointer is utilized to read each scale. Such single pointers typically extend to the larger English scale and block the corresponding reading on the Metric scale. The blocked and covered reading is the reading that relates to the actual reading provided by the pointer. Accordingly, such pointers make it difficult to accurately read the Metric or secondary scale.

It is known to provide a pointer with a hollowed out center section. The center section provides for viewing of the smaller Metric scale, however, the accuracy is limited due to the absence of a true pointer as is provided for the larger English or primary scale. Further, the hollowed out center section of the pointer creates challenges to illuminating the tip of the pointer by conventional methods.

Accordingly, it is desirable to develop and design an illuminated pointer that provides accurate visual indication on two scales simultaneously.

SUMMARY OF THE INVENTION

An example illuminated pointer includes a first pointer for indicating on a primary scale and a second pointer for indicating on a secondary scale. The pointer includes three light reflecting surfaces for illuminating the outer pointer and the inner pointer.

The illuminated pointer includes a first pointer and a second pointer. The first pointer points to a numerical value on a primary scale and the second pointer points to a numerical value on a secondary scale. The first pointer is generally elliptically shaped with an opening. The opening provides for clear viewing of the secondary scale. The second pointer extends partially into the opening to point to a numeric value on the secondary scale. The combination of the opening and the second pointer provides an accurate and readable visual reference of vehicle speed as indicated on the secondary scale.

The pointer assembly is illuminated in both the first pointer and the second pointer. The first pointer and the second pointer are substantially evenly illuminated utilizing a single light source. Light from the light source propagates into the pointer assembly and is scattered on a bottom surface. The base includes three inclined reflective surfaces, each of which reflects a portion of light emitted from the light source along and through first and second legs of the first pointer and through the second pointer. The inclined reflective surfaces include angles relative to an axis that decreases the amount of light that passes through the reflective surfaces. This results in an increase in light that is reflected within the pointer assembly, resulting in a desirable increase in overall brightness of the pointer assembly.

Accordingly, the pointer assembly of this invention provides an illuminated pointer that provides an accurate visual indication on two scales simultaneously.

These and other features of the present invention can be best understood from the following specification and drawings, the following of which is a brief description.

DETAILED DESCRIPTION OF THE PREFERRED EMBODIMENT

Figure 1:
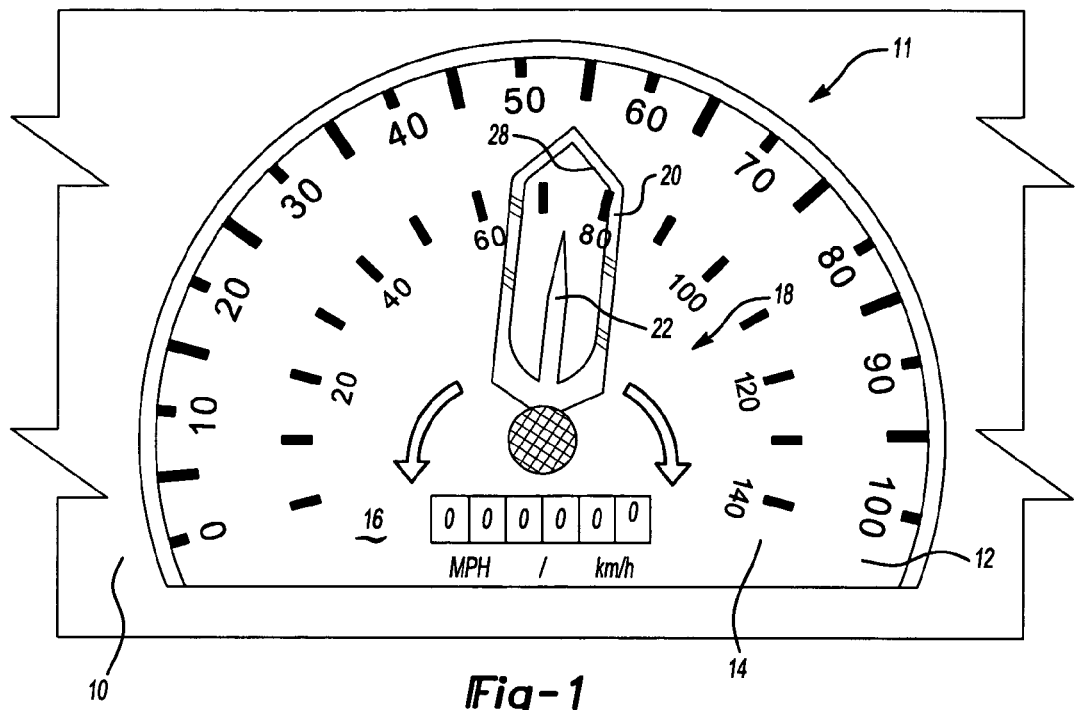
FIG. 1 is a plane view of a speedometer including two scales and an illuminated pointer according to this invention.

FIG. 1 shows an instrument panel 10 including a speedometer 11. The speedometer 11 includes a primary scale 12 and a secondary scale 14. The scales are represented on a graphical display 16. The example illustrated includes the primary scale 12 in English units indicating a speed of a vehicle in miles per hour (MPH) and the secondary scale 14 in Metric units indicating a vehicle speed in Kilometers per hour (KM/h). As appreciated the units on the primary and secondary scales 12 and 14 can be of known scale or reversed as desired for a specific application.

A pointer assembly 18 includes a first pointer 20 and a second pointer 22. The first pointer 20 points to a numerical value on the primary scale 12 and the second pointer points to a numerical value on the secondary scale 14. The first pointer 20 is a generally elliptical shape with an opening 28. The opening 28 provides for clear viewing of the secondary scale 14. The second pointer 22 extends partially into the opening 28 to point to a numeric value on the secondary scale 14. The combination of the opening 28 and the second pointer 22 provides an accurate and readable visual reference of vehicle speed as indicated on the secondary scale.

Figure 2:
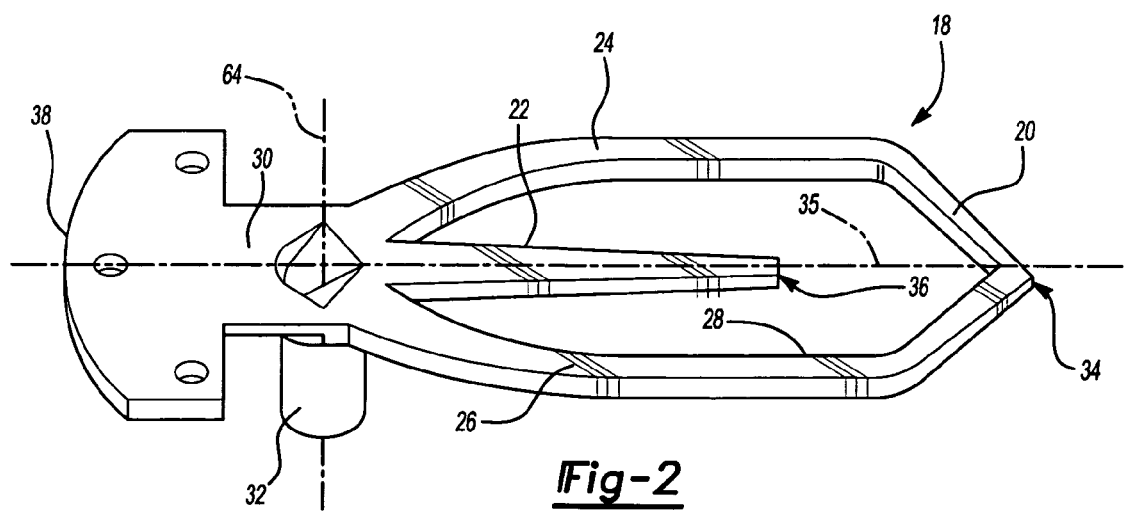
FIG. 2 is a perspective view of an illuminated pointer according to this invention.

Referring to FIG. 2, the pointer assembly 18 includes a base 30 that is supported atop a shaft 32. A first leg 24 and a second leg 26 extend from the base and project radially outward. Each of the first leg 24 and the second leg 26 terminate at a tip 34. The tip 34 provides the visual reference pointer to the numeric value reading on the graphical display 16. The second pointer 22 also extends from the base between both the first and second legs 24, 26 into the opening 28. The second pointer 22 terminates at a tip 36 disposed within the opening and along a common axis 35 with the tip 34 of the first pointer 20. The overall length of the first pointer 20 from the base 30 to the tip 34 corresponds with the radius of the primary scale 12. Further the length of the second pointer 22 from the base 30 to the tip 36 corresponds with the radius of the secondary scale 14.

Figure 3:
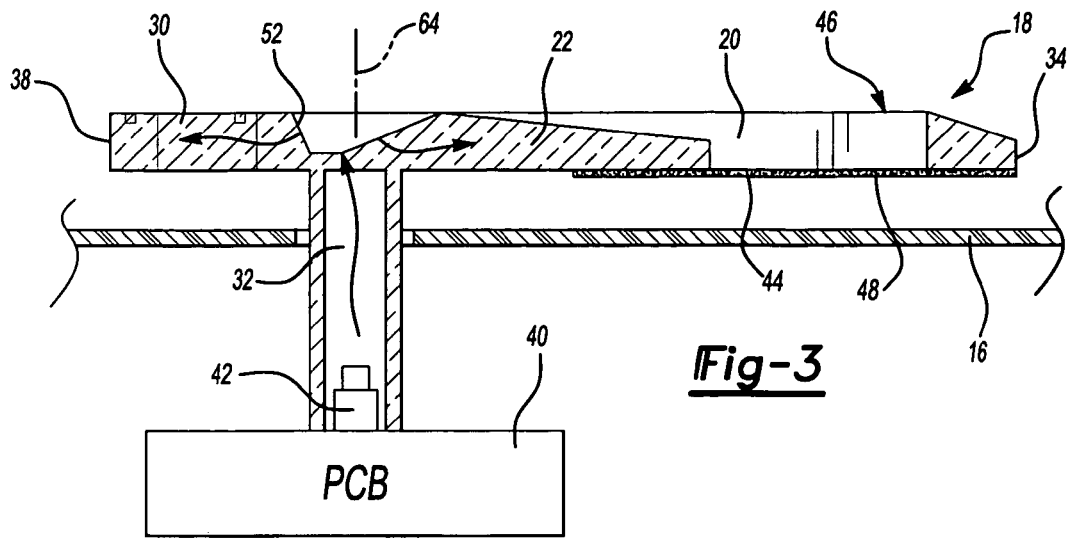
FIG. 3 is a cross-sectional view of an illuminated pointer with a light source.

Referring to FIG. 3, the pointer assembly 18 is illuminated in both the first pointer 20 and the second pointer 22. The first pointer 20 and the second pointer 22 are substantially evenly illuminated utilizing a single light source 42. In the example embodiment the light source 42 is mounted to a printed circuit board (PCB) 40. The shaft 32 is hollow and serves as a light guide for light emitted from the light source 42. The base of the pointer assembly 18 includes three surfaces that provide total internal reflection. Reflected light from the light source 42 propagates into the pointer assembly 18 and is scattered on a bottom surface. The base 30 includes the light reflecting surfaces, one of which is indicated at 52.

Figure 4:
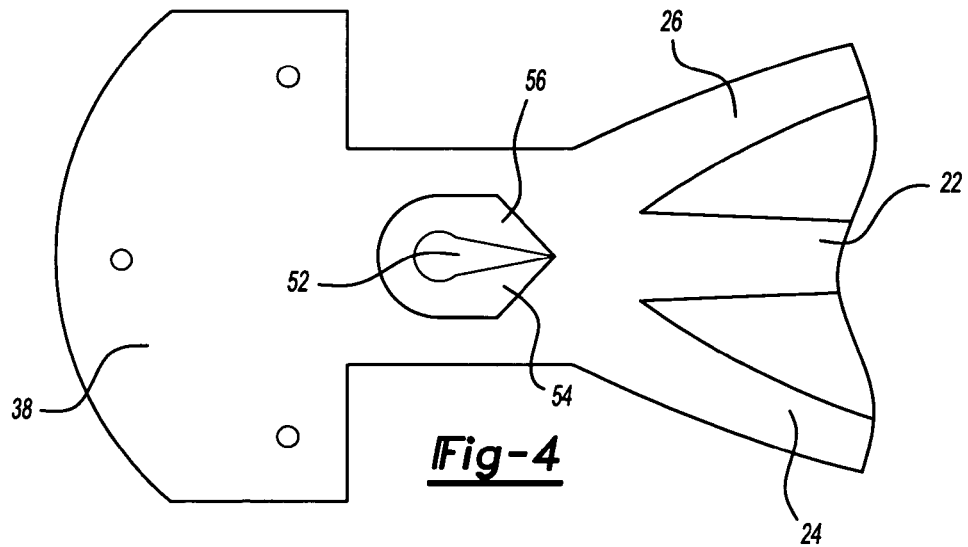
FIG. 4 is an enlarged view of the illuminated pointer including light reflecting surfaces.

Referring to FIG. 4, the base 30 includes the three inclined reflective surfaces 52, 54 and 56. Each of the inclined reflective surfaces 52,54, and 56 reflect a portion of light emitted from the light source 42 along and through the first and second legs 24, 26 of the first pointer 20 and through the second pointer 24. The length shape and angle of each inclined reflecting surface is determined to direct light along a desired path through the different portion of the pointer assembly. A worker versed in the art with the benefit of this disclosure would understand how to configure a light-reflecting surface to direct light along a desired path.

Further, the inclined reflective surfaces 52, 54, 56 include angles relative to the axis 64 and light emitted through the shaft 32 that decrease the portion of light that passes through the reflective surfaces. This results in an increase in light that is reflected within the pointer assembly, resulting in a desirable increase in light that is delivered to the lower scattering surface of the pointer assembly 18. This results in an increase in overall brightness of the pointer assembly 18.

Figure 5:
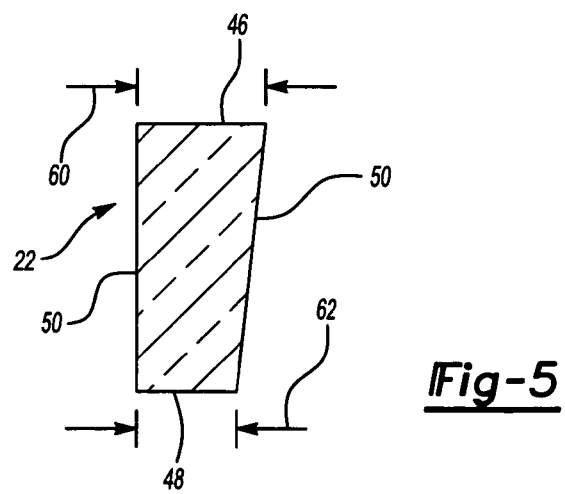
FIG. 5 is a cross-sectional view through a section of the illuminated pointer.

Referring to FIG. 5, the second pointer 22 is shown in cross-section and includes a bottom surface 48 a top surface 46 and sides 50. The cross-section is substantially rectangular with the bottom surface 48 having a width 62 that is smaller than a width 60 of the top surface 46. The bottom surface 48 provides for scattering of light that then passes to the upper surface 46 and is visible to a vehicle operator. The change in height, and width of the surfaces of the pointer 22 provide for adjustment to illumination characteristics of the pointer assembly 18. Such adjustments provide for the even and uniform illumination of the pointer 22. As appreciated, although a cross-section of the second pointer 22 is shown, the cross-sections for the first and second legs 24,26 of the first pointer 20 are similar and may also be adjusted to provide desired illumination characteristics.

Figure 6:
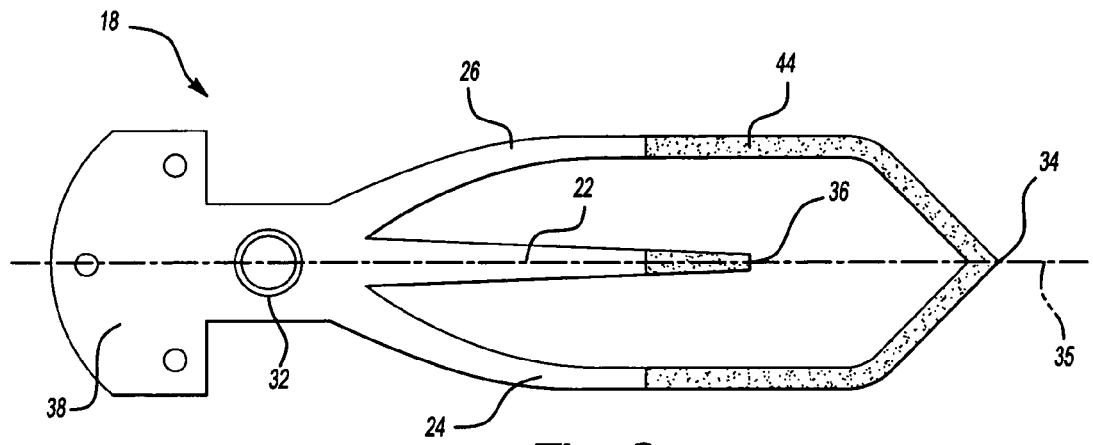
FIG. 6 is a view of a bottom side of the illuminated pointer.

Referring to FIG. 6, the lower surface 48 of the pointer assembly 18 is covered with a reflective white layer 44. The reflective white layer 44 is applied to the pointer assembly 18 to prevent illumination from leaking through the bottom surface 48. Light is reflected off the reflective white layer 44 back toward the top surface 46. The use of the reflective white layer 44 improves light efficiencies. A worker versed in the art with the benefit of this disclosure would understand that any material known in the art may be utilized for the reflective white layer 44.

Figure 7:
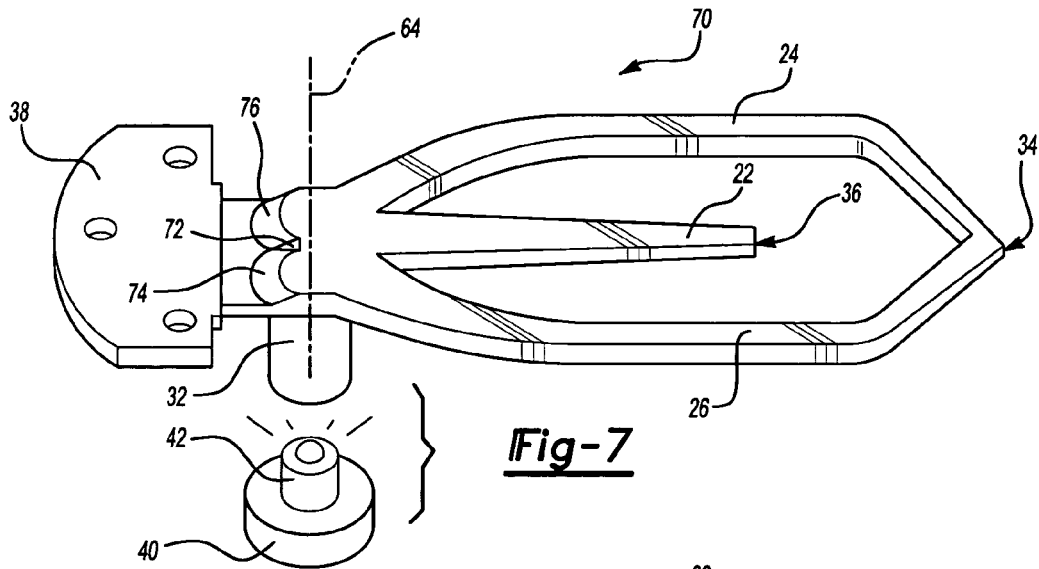
FIG. 7 is a perspective view of another illuminated pointer according to this invention.

Referring to FIG. 7, another pointer assembly 70 includes the first pointer 20 and the second pointer 22. The pointer assembly 70 includes three inclined reflective surfaces 72,74, and 76 that are offset from the axis 64 and shaft 32. The inclined reflective surfaces 72,74, and 76 are positioned on a side opposite the first pointer 20 and the second pointer 22 to reflect light from a light source disposed in a non-axial position with the shaft 32. The three inclined reflective surfaces 72,74, and 76 receive and reflect light from a light source 42 that is positioned on an opposite side of the axis 64 from the first and second pointers 20, 22.

Figure 8:
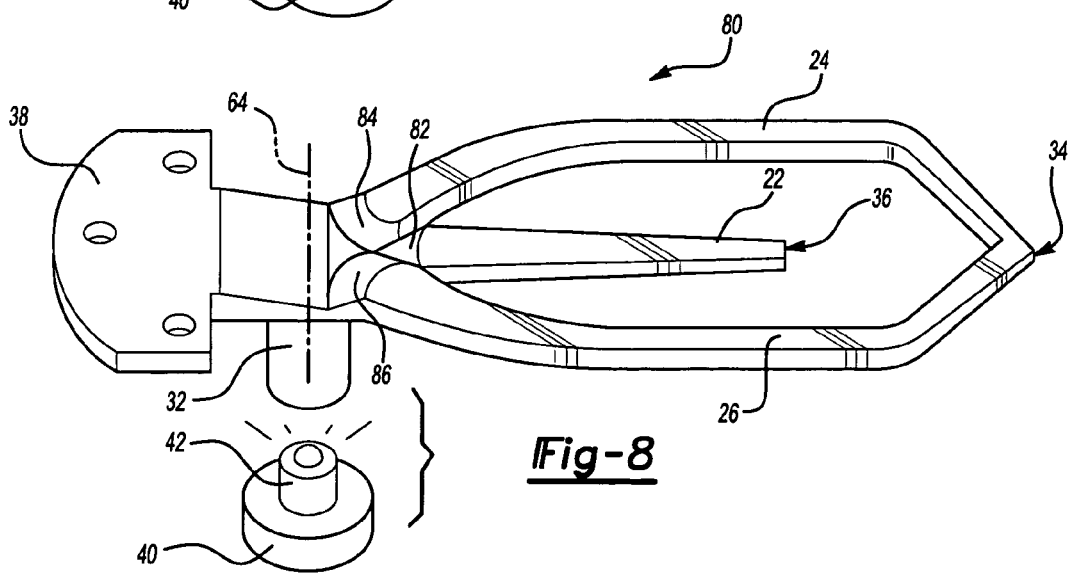
FIG. 8 is a perspective view of still another illuminated pointer according to this invention.

Referring to FIG. 8, another pointer assembly 80 includes inclined reflective surfaces 82,84, and 86 on a side of the axis 64 common to the first pointer 24 and the second pointer 22. In the example pointer assembly 80 a light source 42 is provided on a common side of the axis 64, and the position of the inclined reflective surfaces 82,84, and 86. As appreciated, in some application it is desirable to utilize a non-axially positioned light source and still provide substantially even illumination throughout the pointer assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An illuminated pointer assembly for an instrument panel comprising:
    a shaft;
    a body portion supported atop said shaft, said body portion including a light reflecting surface;
    a first pointer having a first leg and a second leg extending from said body portion in a first direction; and
    a second pointer extending in the first direction from said body portion between said first and second legs, wherein said light reflecting surface includes a first light reflecting surface to direct light into said first leg, a second light reflecting surface to direct light into said second leg and a third light reflecting surface to direct light into said second pointer, wherein each of said first, second and third reflecting surfaces direct light generally in the first direction.

2. The assembly as recited in claim 1, wherein said first and second legs are joined at a pointer segment opposite said body portion.

3. The assembly as recited in claim 1, wherein said light reflecting surface is disposed along an axis of rotation defined by said shaft.

4. The assembly as recited in claim 1, wherein said light reflecting surface is on a side of said shaft common to said first pointer and said second pointer.

5. The assembly as recited in claim 1, wherein said light reflecting surface is on a side of said shaft opposite said first pointer and said second pointer.

6. The assembly as recited in claim 1, wherein said first and second legs include a top surface, a bottom surface and two sides between said top surface and said bottom surface, said top surface and said bottom surface including a width between each of said two sides, wherein said width of said top surface is greater than a width of said bottom surface.

7. The assembly as recited in claim 6, including a reflective coating disposed on at least a portion of said bottom surface.

8. The assembly as recited in claim 1, wherein said pointer rotates about an axis, and said first, second and third reflecting surfaces direct light toward a common side of said axis.

9. An illuminated pointer assembly including:
a body;
a first pointer extending from said body in a first direction and including a tip and an opening;
a second pointer extending from said body in said first direction partially into said opening;
a first light reflecting surface on the body to direct light into the first pointer in the first direction; and
a second light reflecting surface on the body to direct light into the second pointer.

10. The assembly as recited in claim 9, including a shaft extending from said body transverse to said first pointer and said second pointer, said shaft mountable for rotation about a first axis.

11. The assembly as recited in claim 10, wherein said shaft is hollow and directs light onto said light reflecting surface.

12. The assembly as recited in claim 9, including a third light reflecting surfaces directing light into said first pointer.

13. The assembly as recited in claim 12, wherein said first pointer includes a first leg and a second leg joined extending on one end from said body and jointed on another end at said tip, wherein said first light reflecting surface directs light into said first leg and said third light reflecting surface directs light into said second leg.

14. The assembly as recited in claim 13, wherein said second light reflecting surface directs light into said second pointer.

15. The assembly as recited in claim 9, wherein said pointer rotates about an axis, and said first and second light reflecting surfaces direct light toward a common side of said axis.

* * * * *